United States Patent [19]
Collins et al.

[11] Patent Number: 5,137,159
[45] Date of Patent: Aug. 11, 1992

[54] PUSH-BACK RACK

[75] Inventors: Ellsworth H. Collins, Washington; James F. Mattingly, Louisville, both of Ky.; Allen B. Kautz, Wheaton, Ill.

[73] Assignee: The Interlake Companies, Inc., Shepherdsville, Ky.

[21] Appl. No.: 655,819

[22] Filed: Feb. 15, 1991

[51] Int. Cl.⁵ .................................................. A47F 5/00
[52] U.S. Cl. .................................... 211/151; 211/59.2
[58] Field of Search ................ 211/151, 59.2; 414/276

[56] References Cited

U.S. PATENT DOCUMENTS

| | | |
|---|---|---|
| 3,038,613 | 6/1962 | Sylvester et al. . |
| 3,399,784 | 9/1968 | Buchbinder et al. . |
| 3,465,894 | 9/1969 | Setecka . |
| 3,567,039 | 3/1971 | Evans . |
| 3,659,723 | 5/1972 | Konstant . |
| 3,757,967 | 9/1973 | Colbridge . |
| 3,785,502 | 1/1974 | Konstant . |
| 4,155,462 | 5/1979 | Bendel . |
| 4,168,780 | 9/1979 | Parrott . |
| 4,197,047 | 4/1980 | Haldimann . |
| 4,341,313 | 7/1982 | Doring . |
| 4,462,500 | 7/1984 | Konstant et al. . |
| 4,613,270 | 9/1986 | Konstant et al. . |
| 4,687,404 | 8/1987 | Seiz et al. . |
| 4,773,546 | 9/1988 | Konstant . |
| 4,915,240 | 4/1990 | Konstant . |
| 4,949,852 | 8/1990 | Allen . |
| 4,955,489 | 9/1990 | Allen ................................ 414/276 X |
| 4,982,851 | 1/1991 | Konstant ........................ 414/276 X |
| 4,988,251 | 1/1991 | Kinney . |

FOREIGN PATENT DOCUMENTS 2800447 1/1978 Fed. Rep. of Germany .
503633 2/1971 Switzerland .

Primary Examiner—Alvin C. Chin-Shue
Assistant Examiner—Sarah A. Lechok
Attorney, Agent, or Firm—Theresa Fritz Camoriano

[57] ABSTRACT

A pallet rack has carts which can nest and un-nest while running on the same sets of rails.

19 Claims, 5 Drawing Sheets

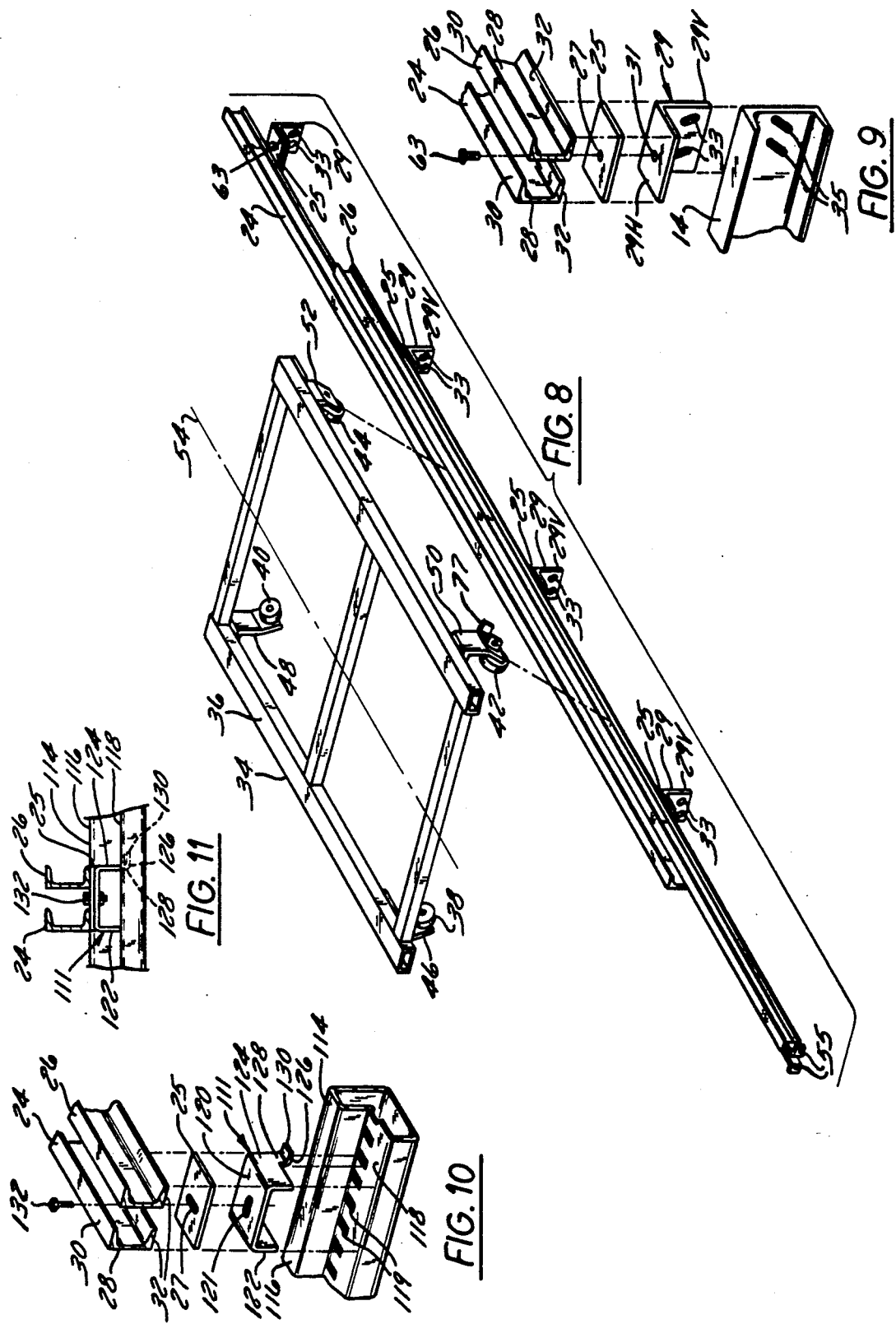

5,137,159

PUSH-BACK RACK

BACKGROUND OF THE INVENTION

Push-back racks are known in the art. These racks are very efficient means for storing goods on pallets, because the pallets can be loaded and unloaded from the front of the rack and can be stored two or more deep in the rack, thereby conserving floor space.

These racks have a large number of storage chambers, each having support rails which lead from the back of the rack to a front opening into which the pallets full of goods are loaded and from which they are unloaded. The support rails are inclined slightly downward toward the front of the rack and carry one or more carts having wheels which ride on the support rails. The carts nest with each other, and, when the carts are empty, they all roll by gravity to the front of the rack to be loaded. The first cart is the highest and receives the first load. When a forklift truck comes with the second load, it pushes the first cart back to uncover a second cart, which receives a second load, and so forth, until all the carts are used up, and the last load is placed directly on the support rails.

In the past, each cart has had its own set of rails on which to ride, so, as more carts are added, additional rails had to be added, making the racks much more expensive. Also, as each new cart was added, the rails had to become wider apart, and the carts had to become wider in order to ride o the rails and straddle the other carts. This widening of each storage chamber to accommodate the additional carts began to defeat the purpose of using push-back racks to conserve storage space. Some manufacturers have created elaborate carts which ride on each other to try to alleviate this problem, but then the carts become expensive.

Also, in the prior art, every set of rails had to extend all the way to the front opening of the storage chamber, because every cart rode on its own set of rails and had to roll to the front of the storage chamber for loading and unloading. The amount of material required for all these rails was substantial and had a large impact on the cost of the rack.

SUMMARY OF THE INVENTION

The present invention provides a rack which is simple and relatively inexpensive to manufacture and which can receive a large number of carts that nest.

The present invention provides a plurality of simple carts, about the size of a pallet. All the carts in one storage chamber can ride on the same set of rails and can nest with each other, so that additional rails are not required in order to add two, three, or more carts to the rack.

The design of the present invention permits portions of the rails to be eliminated, because the inner rails are not required to extend all the way to the front opening, and the outer rails are not required to extend all the way to the rear of the rack. By cutting short some of the rails and completely eliminating the need for other rails, while still using a simple cart, the present invention provides substantial cost savings in the construction of the rack.

BRIEF DESCRIPTION OF THE DRAWINGS

FIG. 8 is an exploded perspective view of one cart and the two right rails on which that cart rides;

FIG. 9 is a broken-away exploded perspective view of the two right rails, showing how the rails are mounted on the rack;

FIG. 10 shows an alternate embodiment which can be used instead of the mounting arrangement of FIG. 9; an FIG. 11 is a front sectional view of the embodiment shown in FIG. 10.

DESCRIPTION OF THE PREFERRED EMBODIMENTS

The following description relates to the embodiment of the invention shown in FIGS. 1-9. A second embodiment, shown in FIGS. 10 and 11 will also be described. It will be obvious to those skilled in the art that other embodiments could be made without departing from the scope of the present invention.

Figure 1:
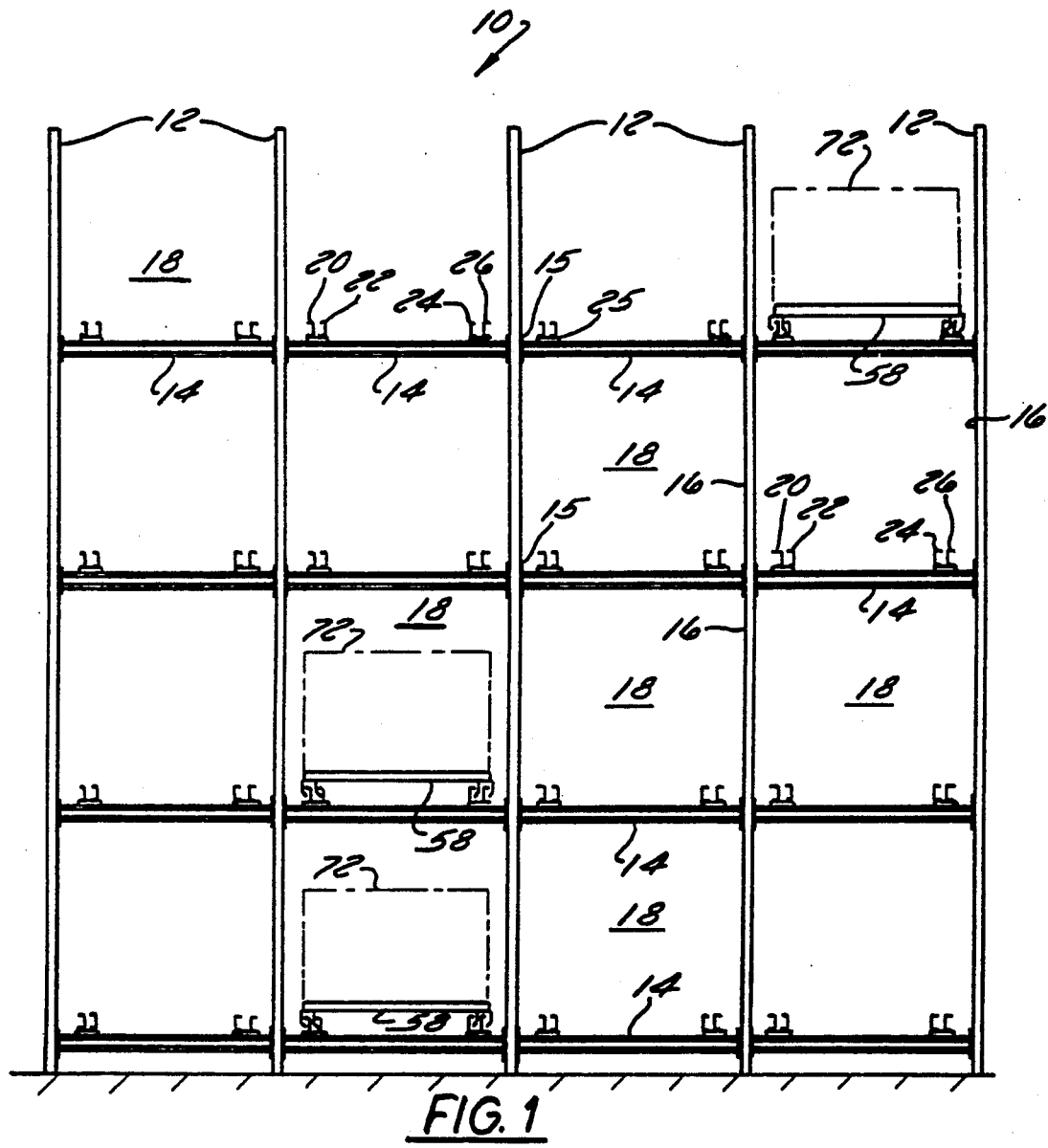
FIG. 1 is a schematic front sectional view of a push-back rack made in accordance with the present invention.
Figure 4:
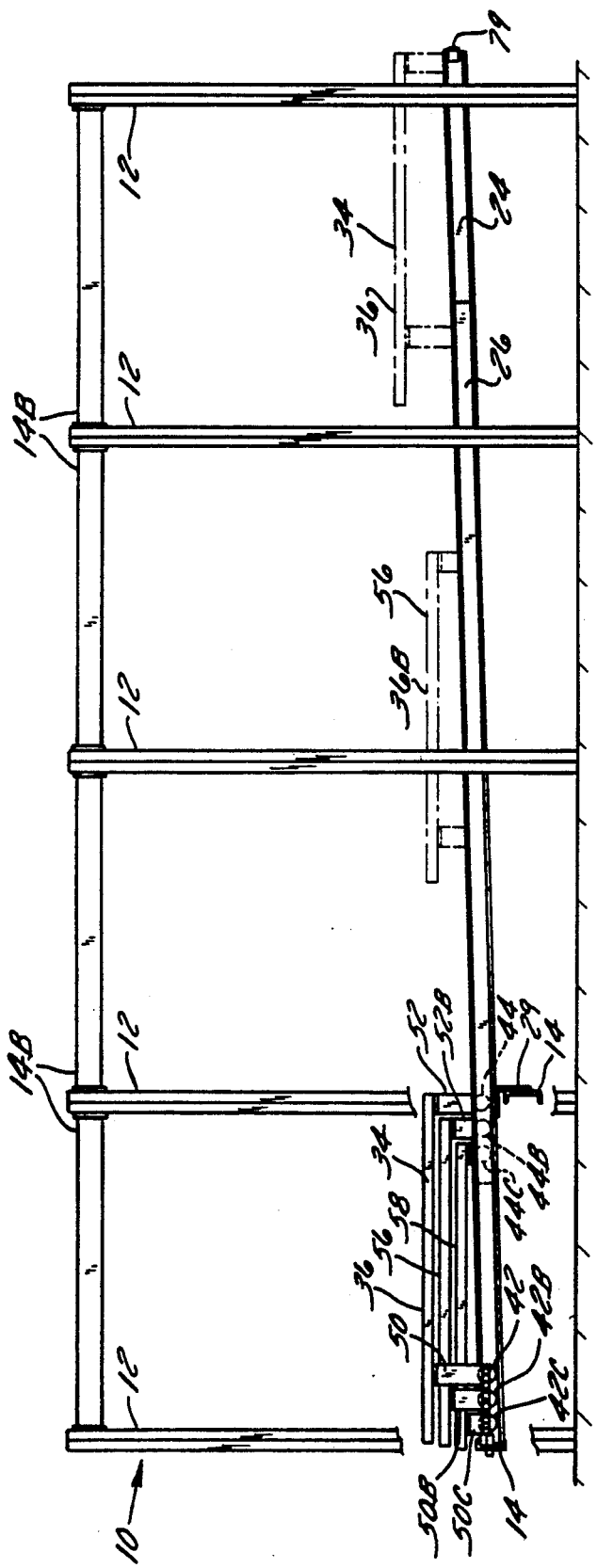
FIG. 4 is a schematic side sectional view showing one storage chamber of the rack of FIG. 1, with the carts empty and nested and showing carts un-nested in phantom.

Referring first to FIG. 1, a rack 10 is made up of vertical structural members 12 and crosswise horizontal structural members 14, which are bolted to the vertical members 12. Additional horizontal structural members 14B extend in a front-to-back direction between the vertical members and are also bolted to the vertical members 12 as shown in FIG. 4. As is shown more clearly in FIGS. 6 and 7, the crosswise horizontal structural members 14 include end plates 15, which define holes 17, that are aligned with holes 19 in the vertical structural members 12 and receive bolts 21. Returning to FIG. 1, the vertical members 12 and horizontal members 14 form openings 16, which define storage chambers 18. The size of the rack 10 and the number of storage chambers 18 will depend upon the requirements of the facility in which the rack 10 is installed.

Figures 6, 7:
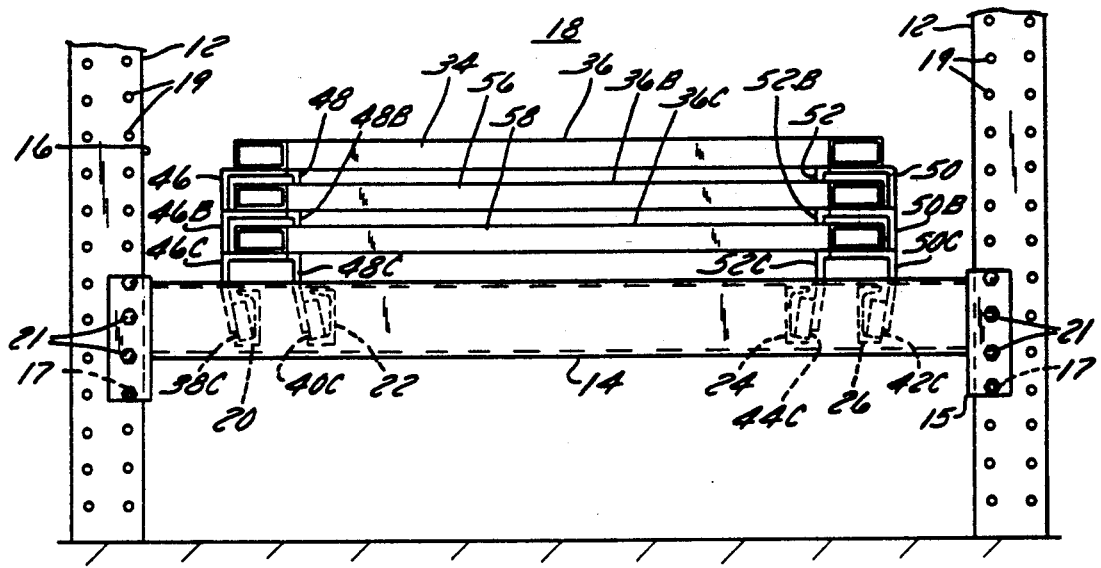
FIG. 6 is a broken-away front view of the storage chamber shown in FIG. 4.
FIG. 7 is a broken-away front sectional view of the storage chamber or FIG. 4.

Each storage chamber 18 has four rails which are supported by the crosswise horizontal members 14—a left outer rail 20, a left inner rail 22, a right inner rail 24, and a right outer rail 26. As shown in FIG. 7, each of the rails 20, 22, 24, 26 has a C-shaped cross-section, including a vertical leg 28, and upper and lower legs 30, 32, respectively, which project outwardly from the vertical leg 28. The lower legs 32 of the rails support the wheels of carts, which are described later.

The rails are mounted on the horizontal members 14 as shown in detail in FIG. 9. The right inner rail 24 and right outer rail 26 are welded to plates 25 at intervals along their length. (The plates 25 can also be seen in FIG. 8.) In locations where the inner and outer rails 24, 26 are coextensive, these plates 25 keep the rails 24, 26 in the correct position relative to each other, with the inner and outer rails 24, 26 lying parallel to each other and at the same height relative to each other. This welding is intended to be done in the factory and will simplify assembly of the rack 10 in the field.

Each plate 25 has a hole 27 in its center which permits the plates to be readily bolted to brackets 29 in the field. Brackets 29 have an inverted L-shaped cross-section, including a horizontal leg 29H and a vertical leg 29V. The horizontal leg 29H has a hole 31, which is aligned with the hole 27 in the plate 25 and permits the plate (and the rails 24, 26, which are welded to the plate 25) to be bolted to the bracket 29 by means of a bolt 63. The vertical leg 29V of the bracket has a pair of elongated holes 33, which are inclined at approximately +45 degrees from the horizontal. The horizontal support members 14 have elongated holes 35, which are inclined at approximately -45 degrees from the horizontal. The elongated holes 33, 35 permit the bracket 29 to be shifted up or down relative to the horizontal support 14 to any position within a range of approximately two inches and then to be bolted in place. Since the holes 19 in the vertical support 12 are spaced at two-inch intervals, and the elongated holes 33, 35 provide two inches of adjustment, the rails 24, 26 can be mounted at any desired height on the rack.

This bracket arrangement makes field assembly of the rack relatively easy. It requires no welding in the field and permits the person doing the assembly to make adjustments as needed to be sure that all the support brackets 29 are at the correct height to provide the desired downward pitch on the rails. The same arrangement of brackets 29 and plates 25 is used on the left side of the rack.

Figure 3:
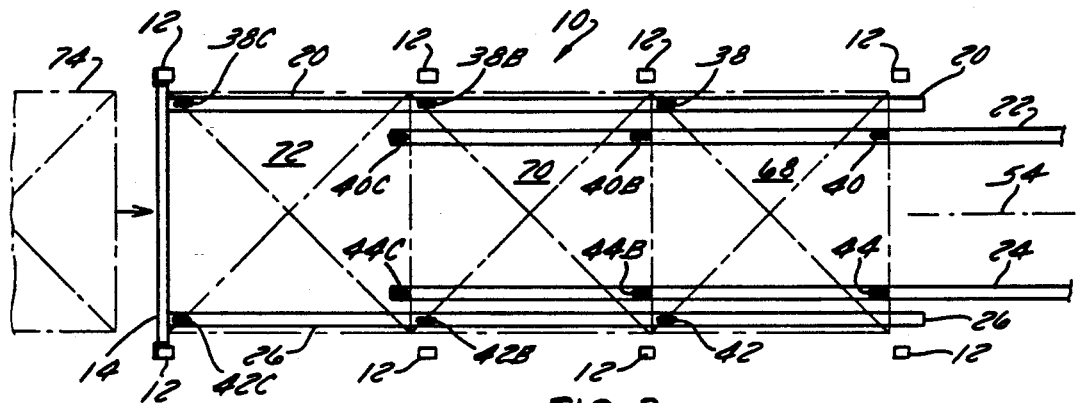
FIG. 3 is a schematic top view showing a storage chamber of the rack as the load is being inserted into the rack, with most of the horizontal structural members and the cart removed for clarity.

FIGS. 4-7 show three carts nested in a storage chamber 18. The first cart 34 is the tallest of the carts and includes a flat pallet support surface 36, which is supported by four wheels—a left front wheel 38, a left rear wheel 40, a right front wheel 42, and a right rear wheel 44 (shown best in FIG. 8). The wheels are mounted on the first cart 34 by means of a left front wheel support bracket 46, a left rear bracket 48, a right front bracket 50, and a right rear bracket 52. An imaginary longitudinal centerline 54 runs along the center of each cart, as shown in FIGS. 3 and 8.

The second and third carts 56, 58 are very similar to the first cart 34, having a pallet support surface, four wheels, and four brackets as with the first cart 34, and their parts are assigned the same numbers as the corresponding parts of the first cart, with the letter "B" following the part numbers of the second cart, and the letter "C" following the part numbers of the third cart. The differences between the carts are that the wheel-supporting brackets 46, 48, 50, 52 of the first cart are higher than the corresponding wheel-supporting brackets of the second cart 56, which, in turn, are higher than the corresponding brackets of the third cart 58, in order to permit the carts to nest. It will be noted in FIG. 2 that the carts are built so that their pallet support surfaces 36 are parallel to the ground, even though they ride on rails that are inclined. This is accomplished by making the rear wheel-supporting brackets 48, 52 shorter than the front wheel-supporting brackets 46, 50. It would also be possible to make the top surface of the carts parallel to the rails, by making all the wheel support brackets for a cart the same height.

The flat pallet support surface 36 of the first cart 34 projects beyond its front wheels 38, 42 a longer distance than does the corresponding surface 36B of the second cart 56 by a length approximately equal to the diameter of the front wheels 38B, 40B of the second cart. The flat pallet support surface 36 of the second cart 56, in turn, projects beyond its front wheels more than the corresponding support surface 36C of the third cart by a length approximately equal to the diameter of the front wheels 38C, 40C of the third cart 58, and, when the carts are nested, all of the support surfaces 36, 36B-C extend to the front of the storage chamber 18.

In the first cart 34 and in all the other carts, the front wheels 38, 42 are farther from the imaginary centerline 54 than are their respective rear wheels 40, 44. When the wheels 38, 40, 42, 44 rotate, they trace spaced, parallel paths. The paths traced by the rear wheels 40, 44 lie entirely inside the paths traced by the front wheels 38, 42 (as seen best in FIG. 3). This permits the front wheels 38, 42 to run on the outside rails 22, 26, and the rear wheels 40, 44 to run on the inside rails 22, 24, respectively. The fact that the paths traced by the rear wheels 40, 44 are entirely inside the paths traced by the front wheels 38, 42 permits the carts 34, 56, 58 to nest, even though all three carts run on the same rails.

Figure 5:
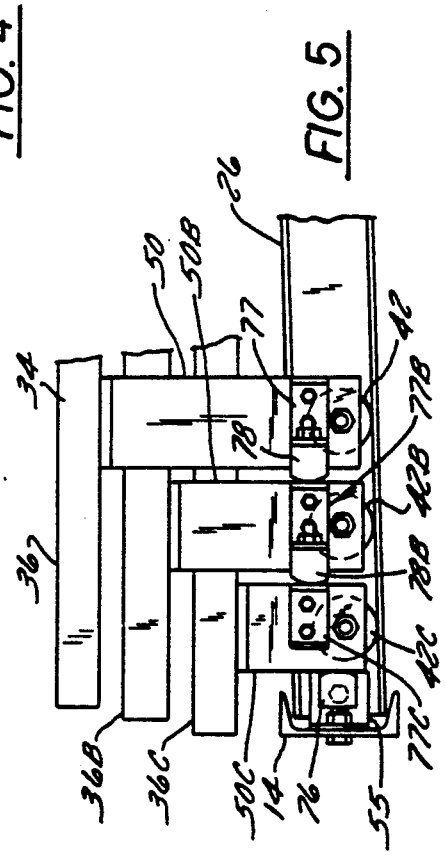
FIG. 5 is a broken-away, enlarged view of the front portion of FIG. 4.

FIG. 5 shows that a bracket 55 at the front end of the outer rail 26 is bolted to the front horizontal support 14, and a bumper 76 is mounted inside the right outer rail 26 near the front end. The same mounting arrangement, including a front bracket 55 and bumper 76 are used on the left outer rail 20. The bumper 76 abuts its respective front wheel support bracket 46C or 50C, when the third cart 58 is at the front of the rack. Each of the front wheel support brackets 46, 50 has a U-shaped member 77 bolted onto it, with the legs of the U-shaped member projecting outwardly. The first and second carts have a rubber bumper 78 bolted to the front leg of the U-shaped member so as to contact the rear leg of the U-shaped member of the next cart, when the carts are nested.

The nesting is accomplished as shown in FIGS. 4-7. The wheel support brackets 46, 48, 50, 52 of the first cart 34 are higher than those of the other carts, which makes the first cart 34 higher than the other carts. The first cart can nest with the second cart 56 by rolling over the second cart 56 from back to front, with the front wheels 38, 42 of the first cart 34 straddling the second cart 56 until the bumpers 78 of the first cart contact the brackets 77 of the second cart 56. The rear wheels 40B and 44B of the second cart 56 do not interfere with the nesting, because they are entirely inside the path of the front wheels 38, 42 and below the top surface 36 of the first cart.

Similarly, the brackets 46B, 48B, 50B, 52B of the second cart 56 are higher than those of the third cart 58, so the nested first and second carts 34, 56 can nest with the third cart 58 by rolling over the third cart 58 from back to front, with the front wheels of the first and second carts straddling the third cart 58 until the bumpers 78B of the second cart abut the brackets 77C of the third cart 58. As the carts move forward, the bumpers 76 at the front of the rack contact the front wheel support brackets 46C, 50C on the third cart 58 and stop the three nested carts. There is also a stop 79 bolted to the rear of each of the inner rails 22, 24, which prevents the carts from rolling off the back of the rack. The rear stops 79 are intended to be installed after the carts are installed on the rack, as the carts are intended to be installed from the rear of the rack.

In this way, the respective left and right front wheels of all the carts 34, 56, 58 are aligned and running on their respective outside rails 20, 26, and the respective left and right rear wheels of all the carts 34, 56, 58 are aligned and running on their respective inside rails 22, 24. Additional carts could be added by making them successively taller so they can nest over the next tallest cart. No additional rails will be required, and the width of the chamber 18 need not be increased to accommodate additional carts. The height of the chamber 18 will increase slightly more than the thickness of the pallet support portion 36 for each additional cart, and, of course, the depth of the chamber 18 (the length of the rails) will increase for each additional cart.

It can be seen in the top view of FIG. 3 that the inner rails 22, 24 do not extend all the way to the front opening 16. It is not necessary for them to extend all the way to the front opening, because the inner rails 22, 24 only carry the rear wheels of the cart, and the rear wheels never reach the front of the rack. In this way, approximately one pallet's length of material is saved on each inner rail. Similarly, the outer rails 20, 26 terminate approximately one pallet's length short of the back of the rack, because the outer rails 20, 26 only carry the front wheels of the carts, and the front wheels never travel all the way to the back of the rack.

Also, because each rail only carries one-fourth of the weight of each cart, the rails need not be as strong as would be required if each rail were to support one-half of the weight of the cart, as is the case in the prior art designs. Again, this represents a savings of material and of cost over prior art designs.

The wheel-support brackets 46, 48, 50, 52 and their counterparts on the second and third carts have an inverted L-shaped cross-section, including a substantially vertical leg and a substantially horizontal leg. The horizontal leg is bolted or welded to the bottom of the pallet support 36, and the lower portion of the vertical leg is angled inwardly, so that the axis of rotation of the wheel is at an angle to the horizontal. This is advantageous for a couple of reasons. First, the top surface of the lower legs 32 of the rails 20, 22, 24, 26 is not horizontal but rather lies at a slight angle to the horizontal, so that the surface is inclined downward as it extends outwardly away from the vertical leg 28. By inclining the axis of rotation of the wheel to match the angle of incline of the surface on which the wheel rides, good surface contact is achieved between the wheels and their rails. Also, the angle of incline of the wheels and the rails causes the carts to tend to center themselves on the rack.

Figure 2:
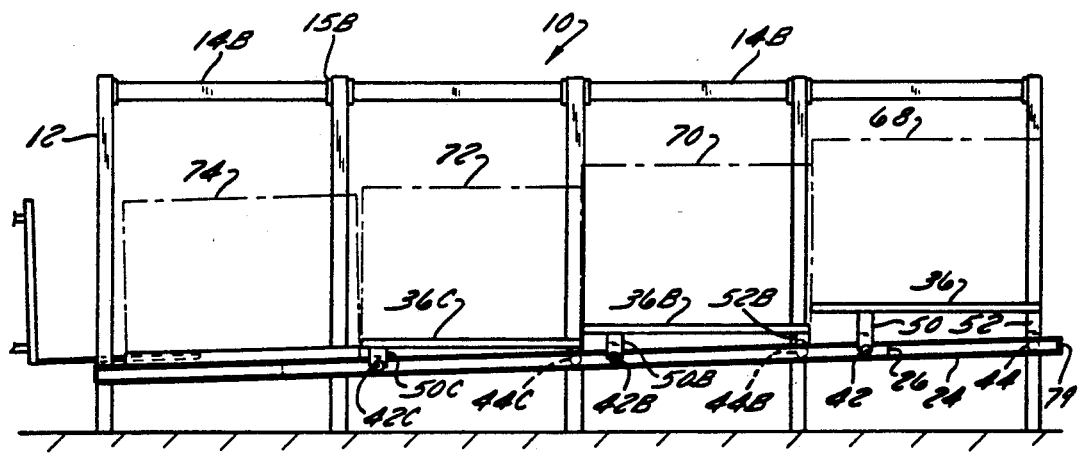
FIG. 2 is a schematic side view showing one storage chamber of the rack of FIG. 1 with the carts loaded.

Operation of the rack is as follows:

When the chamber 18 is empty, all the carts 34, 56, 58 roll forward along the inclined rails and nest with each other, so they are all located at the front of the rack. When a forklift arrives to load a pallet 68 on the rack, it places the pallet 68 full of goods on the first cart 34. When the forklift arrives with a second pallet 70, it lifts the second pallet 70 up to the same front opening 16, and, as it pushes the loaded pallet 70 into the front opening 16, the second pallet 70 pushes the first cart backward into the rack. When the first cart 34 has moved back far enough to expose the second cart 56, the forklift places the second pallet 70 on the second cart 56. At this point, the first and second carts 34, 56 are "un-nested", with no overlap between them. When the forklift arrives with a third pallet 72, it uses the third pallet 72 to push the second cart 56 backward into the rack, which, in turn, pushes the first cart 34 backward into the rack. When the second cart 56 has moved backward enough to expose the third cart 58 (un-nesting the second and third carts), the forklift deposits the third pallet 72 on the third cart 58. When the forklift arrives with the fourth pallet 74, it uses the fourth pallet 74 to push the third cart 58 backward into the rack, which, in turn, pushes the other carts 56, 34 farther back. When enough of the top surface of the rails has been exposed, the forklift deposits the fourth pallet 74 on the upper legs 30 of the outer rails 20, 26. FIG. 3 shows the fourth pallet 74 being loaded onto the rack. FIG. 2 shows the forklift as it is lowering the fourth pallet 74 onto the rails.

To remove the pallets from the rack, the reverse procedure is followed. The last load 74 will be removed first, and, as it is removed, the three carts 58, 56, 34 will roll forward until the third pallet 72 reaches the front opening 16. When the forklift removes the third pallet 72, the second cart 56 rolls forward and nests with the third cart, so that the second pallet 70 reaches the front opening 16. When the second pallet 70 is removed, the first cart 34 nests with the other two carts 56, 58, so the first pallet 68 reaches the front opening 16 and can be removed from the rack.

Thus, the present invention provides a push-back rack design which is simple and relatively inexpensive to manufacture and which permits several carts to be run on the same set of rails, with all the carts nesting. The carts can also completely un-nest, as in FIG. 2, without lifting the wheels from their tracks. Since the carts can be nested and un-nested as required, the smallest possible amount of material is used to build the carts and the rack to store them, again conserving materials and cost.

A second embodiment of the invention is shown in FIGS. 10 and 11, which show a different arrangement for mounting the rails on the beam. In this arrangement, the rails 24, 26 remain the same as in the first embodiment. The rails 24, 26 are also welded to a plate 25, which has a central hole 27, as in the first embodiment. The differences are that the horizontal beam 114 in FIGS. 10 and 11 is different from the horizontal beam 14 in FIG. 9, and the connector 111 in the second embodiment is different from the bracket 29 of FIG. 9.

In this second embodiment, the horizontal beam 114 is a formed structural member and includes a horizontal support portion 116 and a perforated portion 118 defining several perforations 119, which extend over only a portion of the depth of the perforated portion 118. The perforated portion 118 is parallel to the horizontal support portion 116 and lies at a lower elevation than the support portion 116. The connector 111 includes a horizontal top surface 120, which defines a hole 121. A pair of vertical legs 122, 124 extend downward from the top surface 120. A projection 126 extends downward and outward from one of the vertical legs 124. The projection 126 extends over only a portion of the depth of the vertical leg 124. The projection 126 includes a downwardly-extending portion 128 and an outwardly-extending portion 130.

In order to install the rails 24, 26 on the beam 114 in this second embodiment, the connector 111 must first be connected to the beam 114 by orienting the connector vertically, so the outwardly-extending portion 130 of the projection 126 enters one of the perforations 119 of the beam 114, and then rotating the connector 111 counter-clockwise, until the vertical legs 122, 124 rest on the perforated portion 118 of the beam 114, and the outwardly-projecting portion of the projection 119 lies horizontally below the perforated portion 118 of the beam. Since the perforations 119 extend over only a portion of the depth of the perforated portion 118 of the beam 114 and the projection 126 extends over only a portion of the depth of the vertical leg 124, there remains some surface area for the vertical leg 124 to contact the perforated portion 118 of the beam. Once the connector 111 has been installed, it is prevented from being lifted upward relative to the beam 114 by the outwardly-extending portion 130 of the projection 126 contacting the perforated portion 118 of the beam 114. It is prevented from moving downward relative to the beam 114 by the vertical legs 122, 124 contacting the perforated portion 118 of the beam 114. It is prevented from moving to the left or right, or forward or backward relative to the beam 114 by the downwardly-projecting portion 128 of the projection contacting the perforated portion 118 of the beam 114 (the portion of the beam surrounding the perforation 119).

After installing the connector 111 on the beam 114, the rails 24, 26 are placed across the beam 114 at approximately right angles, with the rails 24, 26 resting on the support portion 116 of the beam. The top surface 120 of the connector 111 lies slightly below the top surface of the support portion 116, to provide room for the plate 25. The hole 27 in the plate 25 is aligned with the hole 121 in the connector, and a bolt 132 is extended through the holes 27, 121, to connect the rails 24, 26 to the beam 114. Since the rails sit directly on the support portion 116 of the beam 114, the weight of the rails 24, 26 is carried by the support portion 116 of the beam 114, not by the connector 111, but the connector 111 prevents the rails 24 26 from moving relative to the beam 114.

It will be obvious to those skilled in the art that modifications may be made to the embodiments described above without departing from the scope of the present invention.

What is claimed is:

1. First and second carts for a pallet rack, each of said carts comprising:
a cart structure defining a load-carrying top surface, a front, a rear, a left side, a right side, and a longitudinal centerline;
a plurality of wheels mounted on said cart structure and adapted to carry said cart structure, including a left front wheel; a left rear wheel; a right front wheel; and a right rear wheel; wherein the front wheels of each of said carts lie at a greater distance from said longitudinal centerline than do their respective rear wheels, such that the paths traced by said front wheels lie entirely outside the paths traced by their respective rear wheels; and
wherein the cart structure of said first cart is higher than the second cart, so that said first and second carts can nest, with the respective front wheels of said first cart being in line with the respective front wheels of the second cart and the respective rear wheels of the first cart being in line with the respective rear wheels of the second cart, wherein the front wheels of the first cart straddle said second cart as the first cart rolls over the second cart from rear to front.

2. First and second carts for a pallet rack, as recited in claim 1, and further comprising a third cart for a pallet rack, said third cart comprising:
a cart structure defining a load-carrying top surface, a front, a rear, a left side, a right side, and a longitudinal centerline;
a plurality of wheels mounted on said cart structure and adapted to carry said cart structure, including a left front wheel; a left rear wheel; a right front wheel; and a right rear wheel; wherein the front wheels of said third cart lie at a greater distance from said longitudinal centerline than do their respective rear wheels, such that the paths traced by the front wheels of said third cart lie entirely outside the paths traced by their respective rear wheels;
wherein the cart structure of said second cart is higher than the third cart, so that said second and third carts can nest, with the respective front wheels of said first, second, and third carts lying in a line and the respective rear wheels of said first, second, and third carts lying in a line, such that the front wheels of said second cart straddle the third cart as the second cart rolls over the third cart from rear to front.

3. A pallet rack, comprising:
a rack structure defining a plurality of storage chambers, each of said storage chambers having a back end, a front end, and a support portion extending from said back end to said front end;
wherein at least one of said storage chambers is adapted to receive a plurality of nested carts along is entire length from front to back and includes left and right outer support rail portions and left and right inner support rail portions for receiving the wheels of said carts, said outer support rail portions extending from said front end toward said back end and terminating a substantial distance short of said back end so as to conserve material.

4. A pallet rack as recited in claim 3, wherein said inner support rail portions extend from said back end toward said front end, terminating a substantial distance short of said front end.

5. A pallet rack as recited in claim 4, wherein said inner support rail portions and said outer support rail portions are coextensive for a substantial distance.

6. A pallet rack as recited in claim 5, wherein said inner support rail portions and said outer support rail portions have C-shaped cross-sections, each defined by a vertical leg and upper and lower outwardly-directed legs projecting from said vertical leg.

7. A pallet rack as recited in claim 6, wherein the lower legs of said inner support rail portions and of said outer support rail portions lie substantially in a plane.

8. A pallet rack as recited in claim 7, wherein the upper legs of said outer support rails lie substantially in a plane, so they can receive a pallet resting directly on the upper legs at the front end of the rack.

9. A pallet rack, comprising:
a rack structure defining a plurality of storage chambers, each of said storage chambers having a back end, a front end, and a support portion extending from said back end to said front end;
wherein at least one of said storage chambers includes left and right outer support rail portions and left and right inner support rail portions for receiving the wheels of a cart, and further comprising:
a cart, including a cart structure, defining a load-carrying top surface, a front, a rear, a left side, a right side, and a longitudinal centerline;

a plurality of wheels mounted on said cart structure and adapted to carry said cart structure, including at least one front wheel and at least one rear wheel; wherein the front wheel of said cart lies at a greater distance from said longitudinal centerline than does the rear wheel, such that said front wheel rides on one of the outer rail portions, and said rear wheel rides on the inner rail portion.

10. A pallet rack, comprising:
a rack structure defining a plurality of storage chambers, each of said storage chambers having a back end, a front end, and a support portion extending from said back end to said front end;
wherein at least one of said storage chamber includes left and right outer support rail portions and left and right inner support rail portions for receiving the wheels of a cart; and
a cart adapted to roll on said support rails, said cart comprising:
a cart structure defining a load-carrying top surface, a front, a rear, a left side, a right side, and a longitudinal centerline;
a plurality of wheels mounted on said cart structure and adapted to carry said cart structure, including a left front wheel; a left rear wheel; a right front wheel; and a right rear wheel; wherein the front wheels lie at a greater distance from said longitudinal centerline than do their respective rear wheels, thereby permitting said left and right front wheels of said cart to ride on said left and right outer rail portions and said left and right rear wheels of said cart to ride on said left and right inner rail portions, respectively.

11. A pallet rack as recited in claim 10, and further comprising:
a second cart adapted to roll on said support rail portions, said second cart comprising:
a cart structure defining a load-carrying top surface, a front, a rear, a left side, a right side, and a longitudinal centerline;
a plurality of wheels mounted on said cart structure and adapted to carry said cart structure, including a left front wheel; a left rear wheel; a right front wheel; and a right rear wheel; wherein the front wheels of said second cart lie at a greater distance from said longitudinal centerline than do their respective rear wheels, thereby permitting said left and right front wheels of said second cart to ride on said left and right outer rail portions and said left and right rear wheels of said second cart to ride on said left and right inner rail portions, respectively, and
wherein said first cart is higher than said second cart, such that said carts can nest, with said first cart rolling over said second cart from rear to front with the front wheels of said first cart straddling said second cart.

12. A pallet rack as recited in claim 11, and further comprising:
a third cart adapted to roll on said support rail portions, said third cart comprising:
a cart structure defining a load-carrying top surface, a front, a rear, a left side, a right side, and a longitudinal centerline;
a plurality of wheels mounted on said cart structure and adapted to carry said cart structure, including a left front wheel; a left rear wheel; a right front wheel; and a right·rear wheel; wherein the front wheels of said third cart lie at a greater distance from said longitudinal centerline than do their respective rear wheels, thereby permitting said left and right front wheels of said third cart to ride on said left and right outer rail portions and said left and right rear wheels of said third cart to ride on said left and right inner rail portions, respectively; and
wherein said second cart is higher than said third cart, such that said carts can nest, with said second cart rolling over said third cart from rear to front with the front wheels of said second cart straddling said third cart until the front wheels of the third cart lie adjacent to the front wheels of the second cart.

13. A pallet rack, comprising:
structural members defining a storage chamber having a front end and a back end;
parallel rail portions extending from font to back in said storage chamber;
a plurality of carts, each of said carts including a pallet support surface and a plurality of wheels which support said pallet support surface and which roll on said parallel rail portions;
wherein at least two of the carts roll on the same rail portions, can nest with each other, and can be completely un-nested without lifting the wheels off of the rails.

14. A pallet rack, comprising:
a rack structure defining a plurality of storage chambers, each of said storage chambers having a back end, a front end, and a support portion extending from said back end to said front end;
wherein at least one of said storage chambers includes left and right outer support rail portions and left and right inner support rail portions for receiving the wheels of a cart, and further comprising a plurality of horizontal support beams extending across each of said storage chambers and supporting said rail portions, wherein at least one of said horizontal support beams defines a horizontal support portion and a horizontal perforated portion lying parallel to and at a lower elevation than said horizontal support portion and defining at least one perforation; and
a connector for connecting at least one of said rail portions to said one horizontal support beam, said connector defining a horizontal top surface, a pair of vertical legs projecting downward from said horizontal top surface, and a projection extending from one of said vertical legs, wherein said projection fits into said perforation while said vertical legs rest on said horizontal perforated portion of said one horizontal support beam, and said one rail portion rests on said horizontal support portion of said beam and is fastened to said horizontal top surface of said connector, which prevents said one rail portion from moving relative to said horizontal support beam.

15. A pallet rack as recited in claim 14, wherein said projection extends downward and outward from said vertical leg and can be inserted into said perforation by rotating said connector from a vertical position, in which the outwardly-extending portion of the projection extends into said perforation, to a horizontal position, in which the outwardly-extending portion of the projection lies beneath the horizontal perforated portion of the beam, such that, when said connector is installed on said horizontal support beam, it is prevented from moving upward by said outwardly-extending portion of the projection contacting the horizontal perforated portion, is prevented from moving downward by said vertical legs contacting said horizontal perforated portion, and is prevented from moving forward, backward, and to either side by the downwardly-extending portion of the projection contacting the horizontal perforated portion.

16. In a pallet rack including a horizontal support beam and at least one rail lying substantially perpendicular to and resting on said horizontal support beam, the improvement comprising means for securing said rail to said support beam, including:

said beam defining a support portion and a perforated portion lying at a lower elevation than said support portion and defining at least one perforation in said perforated portion;

a connector including a horizontal portion and two vertical legs projecting downward from said horizontal portion; and a projection extending downward and outward from one of said vertical legs, wherein said projection fits into said perforation and said vertical legs rest on said perforated portion; and means for connecting the beam to said connector.

17. A pallet rack as recited in claim 16, wherein said connector further defines a hole in its horizontal portion for receiving a fastener.

18. A pallet rack, comprising:

a rack structure defining a storage chamber, having left and right inner support rails and left and right outer support rails; and a cart structure, including a load-carrying top surface, and a plurality of wheels mounted on said cart structure and adapted to carry said cart structure, including a left front wheel, which rides on the left inner support rail, a right front wheel, which rides on the right outer support rail, and a right rear wheel, which rides on the right inner support rail.

19. A pallet rack as recited in claim 18, and further comprising a second cart structure, including a load-carrying top surface and wheels attached to said second cart structure for supporting said cart structure, said second cart including a left front wheel, which rides on the left outer support rail, a left rear wheel, which rides on the left inner support rail, a right front wheel, which rides on the right outer suppport rail, and a right rear wheel, which rides on the right inner support rail;

wherin the cart structure of the first cart is higher than the second cart, so that said first and second carts can nest, with the respective front wheels of the first cart straddling said second cart as the first cart rolls over the second cart from rear to front.

* * * * *